United States Patent
Bremm et al.

(10) Patent No.: US 8,230,674 B2
(45) Date of Patent: Jul. 31, 2012

(54) METHOD FOR MONITORING THE NITROGEN OXIDE STORAGE CAPACITY OF A NITROGEN OXIDE STORAGE CATALYST USED IN THE FORM OF A PRIMARY CATALYTIC CONVERTER

(75) Inventors: Stephan Bremm, Kahl (DE); Christian Manfred Tomanik, Reiskirchen (DE); Ulrich Goebel, Hattersheim (DE); Wilfried Mueller, Karben (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1022 days.

(21) Appl. No.: 11/722,135

(22) PCT Filed: Dec. 17, 2005

(86) PCT No.: PCT/EP2005/013617
§ 371 (c)(1),
(2), (4) Date: Aug. 13, 2008

(87) PCT Pub. No.: WO2006/069652
PCT Pub. Date: Jul. 6, 2006

(65) Prior Publication Data
US 2009/0229249 A1    Sep. 17, 2009

(30) Foreign Application Priority Data
Dec. 23, 2004 (DE) .................... 10 2004 062 149

(51) Int. Cl.
*F01N 3/00* (2006.01)
(52) U.S. Cl. ................ 60/276; 60/274; 60/285; 60/295; 60/297
(58) Field of Classification Search .................... 60/274, 60/276, 277, 285, 295, 297
See application file for complete search history.

(56) References Cited

U.S. PATENT DOCUMENTS
6,116,023 A * 9/2000 Ishizuka et al. ................. 60/301
(Continued)

FOREIGN PATENT DOCUMENTS
| | | |
|---|---|---|
| DE | 197 44 738 A1 | 4/1998 |
| DE | 198 16 175 A1 | 10/1999 |
| DE | 199 18 756 A1 | 10/2000 |
| DE | 101 25 759 A1 | 11/2002 |
| EP | 0 936 349 A2 | 8/1999 |
| EP | 1 152 140 A2 | 11/2001 |
| EP | 1 321 643 A1 | 6/2003 |

OTHER PUBLICATIONS

International Preliminary Report on Patentability relating to corresponding International Application No. PCT/EP2005/013617 filed Dec. 17, 2005. Naoto Miyoshi, et al. "Development of New Concept Three-Way Catalyst for Automotive Lean-Burn Engines" SAE 950809—Feb. 27-Mar. 2, 1995 (as cited on p. 2 of the specification).

*Primary Examiner* — Binh Q Tran
(74) *Attorney, Agent, or Firm* — Smith, Gambrell & Russell, LLP

(57) ABSTRACT

Modern exhaust-gas purification systems in motor vehicles with a lean-burn engine include a starting catalyst fitted close to the engine and a main catalyst arranged in the underbody region, with both the starting catalyst and the main catalyst being formed by nitrogen oxide storage catalysts. The nitrogen oxide storage catalysts are in each case regenerated by the engine being briefly switched from lean-burn mode to rich-burn mode when the nitrogen oxide concentration in the exhaust gas downstream of the storage catalysts rises above a predetermined value.

The starting catalyst is exposed to particularly high temperatures and is therefore prone to faster ageing of its nitrogen oxide storage capacity than the main catalyst. To check the nitrogen oxide storage capacity of the starting catalyst, a regeneration which is due for the catalyst system is selected in such a way in terms of its duration and the extent to which the exhaust gas is enriched that substantially only the starting catalyst is regenerated, whereas the main catalyst is not. In this arrangement, the criterion for terminating this partial regeneration is the breakthrough of rich exhaust gas through the starting catalyst. After the engine has been switched back to lean-burn mode, the time which elapses until the concentration of nitrogen oxides in the exhaust gas downstream of the catalyst requires regeneration again is measured. The measured time is a measure of the remaining nitrogen oxide storage capacity of the starting catalyst.

6 Claims, 2 Drawing Sheets

U.S. PATENT DOCUMENTS

| | | | | |
|---|---|---|---|---|
| 6,138,453 A * | 10/2000 | Sawada et al. | | 60/277 |
| 6,539,709 B2 * | 4/2003 | Kubo et al. | | 60/301 |
| 6,705,078 B2 * | 3/2004 | Hahn et al. | | 60/285 |
| 6,729,125 B2 * | 5/2004 | Suga et al. | | 60/285 |
| 6,938,412 B2 * | 9/2005 | Li et al. | | 60/300 |
| 6,941,748 B2 * | 9/2005 | Pott et al. | | 60/295 |
| 7,003,944 B2 * | 2/2006 | Surnilla et al. | | 60/285 |
| 7,296,401 B2 * | 11/2007 | Asanuma et al. | | 60/285 |
| 7,644,578 B2 * | 1/2010 | Goulette et al. | | 60/286 |
| 7,673,445 B2 * | 3/2010 | Goralski et al. | | 60/286 |

* cited by examiner

METHOD FOR MONITORING THE NITROGEN OXIDE STORAGE CAPACITY OF A NITROGEN OXIDE STORAGE CATALYST USED IN THE FORM OF A PRIMARY CATALYTIC CONVERTER

CROSS-REFERENCE TO RELATED APPLICATIONS

This application claims the benefit of priority of German Patent Application No. 10 2004 062 149.7 filed Dec. 23, 2004, and International Application No. PCT/EP2005/013617 filed Dec. 17, 2005, both of which are relied on and incorporated herein by reference.

INTRODUCTION AND BACKGROUND

The present invention relates to a method for monitoring the nitrogen oxide storage capacity of a nitrogen oxide storage catalyst used as a starting catalyst in an exhaust-gas purification system of a motor vehicle with a lean-burn engine, the system including the starting catalyst and a main catalyst, which is likewise designed as a nitrogen oxide storage catalyst.

To reduce the fuel consumption of petrol engines, what are known as lean-burn engines which are operated with lean air/fuel mixes in the part-load range have been developed. A lean air/fuel mix contains an oxygen concentration which is higher than necessary for complete combustion of the fuel. In this case, the corresponding exhaust gas contains the oxidizing components oxygen ($O_2$), nitrogen oxide (NOx) in excess compared to the reducing exhaust-gas components carbon monoxide (CO), hydrogen ($H_2$) and hydrocarbons (HC). Lean exhaust gas usually contains 3 to 15% by volume of oxygen. However, when operating at load and full load, a stoichiometric or even substoichiometric, i.e. rich, air/fuel preparation is realized even in lean-burn spark-ignition engines.

By contrast, diesel engines generally operate under conditions with highly superstoichiometric air/fuel mixes. Only in recent years have diesel engines which can also be operated with rich air/fuel mixes for a short period of time been developed. Diesel engines, in particular those with the option of rich operating phases, are also encompassed by the term lean-burn engines in the context of the present invention.

On account of the high oxygen content of the exhaust gas from lean-burn engines, the nitrogen oxides contained therein cannot be continuously reduced to form nitrogen, with simultaneous oxidation of hydrocarbons and carbon monoxide, with the aid of three-way catalysts as used in spark-ignition engines operated under stoichiometric conditions. Therefore, what are known as nitrogen oxides storage catalysts, which store the nitrogen oxides contained in the lean exhaust gas in the form of nitrates, have been developed for the purpose of removing the nitrogen oxides from the exhaust gas from these engines.

The operation of nitrogen oxide storage catalysts is described extensively in SAE document SAE 950809. According to this, nitrogen oxide storage catalysts consist of a catalyst material, which has generally been applied in the form of a coating to an inert honeycomb carrier made from ceramic or metal, referred to as a carrier. The catalyst material contains the nitrogen oxide storage material and a catalytically active component. The nitrogen oxide storage material in turn consists of the actual nitrogen oxide storage component, which has been deposited in highly disperse form on a support material. The storage components used are predominantly the basic oxides of the alkali metals, the alkaline-earth metals and the rare earths, but in particular barium oxide, which react with nitrogen dioxide to form the corresponding nitrates.

The catalytically active components used are usually the precious metals from the platinum group, which are generally deposited together with the storage component on the support material. The support material used is predominantly active alumina with a high surface area. However, the catalytically active components may also be applied to a separate support material, such as for example active alumina.

The role of the catalytically active components is to convert carbon monoxide and hydrocarbons in the lean exhaust gas into carbon dioxide and water. Moreover, they are intended to oxidize the nitrogen monoxide content of the exhaust gas to form nitrogen dioxide, so that it can react with the basic storage material to form nitrates (storage phase or lean-burn mode), since the nitrogen oxides in the exhaust gas from lean-burn engines, depending on the operating conditions of the engine, are made up of 65 to 95 Vol.-% of nitrogen monoxide, which cannot react with the storage components.

In addition to the abovementioned components, the nitrogen oxide storage catalyst may also contain components that store oxygen. In this case, in addition to the storage of nitrogen oxides, it can also perform functions of a conventional three-way catalyst. For the most part, the oxygen-storing component used is cerium oxide. In addition to its nitrogen oxide storage function, the nitrogen oxide storage catalyst also has an oxygen storage function, meaning that it therefore has two functions.

As the accumulation of nitrogen oxides in the storage material increases, the storage capacity of the material decreases and there is more and more slippage of nitrogen oxides through the storage catalyst. Therefore, the storage catalyst has to be regenerated from time to time. For this purpose, the engine is briefly operated with air/fuel mixes with a stoichiometric or rich composition (during what is known as the regeneration phase or rich-burn mode) Under the reducing conditions in the rich exhaust gas, the nitrates which have formed are decomposed to form nitrogen oxides NOx, which are reduced, using carbon monoxide, hydrogen and hydrocarbons as reducing agents, to form nitrogen together with water and carbon dioxide.

When the nitrogen oxide storage catalyst is operating, the storage phase and regeneration phase alternate at regular intervals. The storage phase usually lasts for between 60 and 120 seconds, whereas the regeneration phase is terminated after less than 20 seconds. It is customary for a nitrogen oxide sensor to be arranged downstream of the storage catalyst in order to determine the optimum instant for switching the engine from the storage phase to the regeneration phase. If the nitrogen oxide concentration in the exhaust gas measured by this sensor rises above a preset threshold value, regeneration of the catalyst is initiated. The nitrogen oxide concentration in the exhaust gas is therefore used as a criterion for initiating regeneration.

Modern nitrogen oxide storage catalysts have a working range of between approximately 150 and 500° C., i.e. below this temperature the storage catalyst can no longer store the nitrogen oxides contained in the exhaust gas in the form of nitrates, since its catalytically active components are not yet able to oxidize the nitrogen oxides to form nitrogen dioxide. Above 500° C., the nitrogen oxides stored as nitrates are thermally decomposed and released to the exhaust gas as nitrogen oxides.

One significant problem in modern exhaust-gas purification methods is that of checking that the catalysts used are functioning correctly, in order to allow catalysts which are no longer functional to be replaced in good time. This also applies to nitrogen oxide storage catalysts, the nitrogen oxide storage capacity of which may be damaged on the one hand by the sulphur which is present in the fuel and on the other hand by thermal overloads. Whereas poisoning by sulphur can generally be reversed by regeneration at elevated temperatures, thermal damage is irreversible.

In the case of storage catalysts with two functions, in principle both storage functions may be damaged by poisoning and thermal influences. In this case, the damage to one function does not necessarily mean damage to the other function. Since nitrogen oxides and oxygen are both oxidizing components, it is not possible to clearly distinguish their effects from one another, and consequently misdiagnoses may occur when testing the catalyst. DE 198 16 175 A1 describes one possible way of separately assessing the two storage functions with the aid of an oxygen sensor arranged downstream of the storage catalyst.

SUMMARY OF THE INVENTION

The present invention deals with an exhaust-gas purification system comprising a starting catalyst and a main catalyst, with both catalysts being designed as nitrogen oxide storage catalysts. In a catalyst system of this type, the starting catalyst is exposed to particularly high temperatures in operation and is therefore prone to faster ageing of its nitrogen oxide storage capacity than the main catalyst. It is therefore necessary for the ageing state of the starting catalyst to be checked more often, in order to be able to establish a malfunction in the catalyst in good time. Therefore, it is an object of the present invention to establish a method for determining the ageing state of the nitrogen oxide storage function of the starting catalyst independently of its oxygen storage function.

The method for achieving the object proceeds from a catalyst system comprising a starting catalyst and a main catalyst, with both catalysts having a nitrogen oxide storage function, and at least the starting catalyst additionally having an oxygen storage function. During normal operation, the catalyst system is regenerated from time to time by the engine being briefly switched from lean-burn mode to rich-burn mode when the evaluation of the nitrogen oxide slippage downstream of the catalyst system exceeds a regeneration criterion.

To determine the nitrogen oxide storage capacity of the starting catalyst, when regeneration of the catalyst system is due the rich-burn mode is terminated and the engine is switched back to lean-burn mode when a breakthrough of rich exhaust gas is recorded between starting catalyst and main catalyst. The time between the engine being switched back to lean-burn mode and the regeneration criterion being exceeded once again downstream of the catalyst system is used as a measure of the remaining nitrogen oxides storage capacity of the starting catalyst.

BRIEF DESCRIPTION OF DRAWINGS

The invention is explained in more detail on the basis of FIGS. 1 and 2, in which.

DETAILED DESCRIPTION OF THE INVENTION

Figure 1:
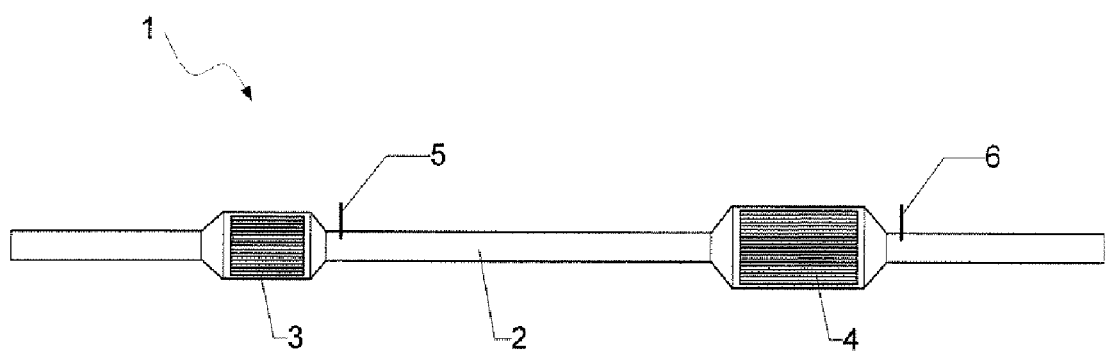
FIG. 1: shows an exhaust-gas purification system for a lean-burn engine having a starting catalyst and a main catalyst.

FIG. 1 shows an exhaust-gas purification system (1) for the lean-burn engine of a motor vehicle. In an exhaust pipe (2), the exhaust-gas purification system includes a catalyst system comprising a starting catalyst (3) and a main catalyst (4). The starting catalyst is usually located close to the engine, whereas the main catalyst is usually arranged in the underbody region of the vehicle. An oxygen sensor (5) is fitted in the exhaust pipe downstream of the starting catalyst, and a nitrogen oxide sensor (6) is fitted in the exhaust pipe downstream of the main catalyst.

Both catalysts are designed as nitrogen oxide storage catalysts and therefore have to be regenerated from time to time by the engine being switched from lean-burn mode (storage phase) to rich-burn mode (regeneration phase), in order for the nitrogen oxides which have been stored during lean running of the engine to be desorbed again and converted into harmless components. The nitrogen oxide sensor downstream of the main catalyst is used to determine the switching point. The nitrogen oxide concentration in the exhaust gas measured by the nitrogen oxide sensor can be used as the criterion for the engine to switch from lean-burn mode to rich-burn mode. If this concentration exceeds a predetermined limit value, regeneration is initiated. This limit value is typically between 30 and 100 ppm by volume, preferably between 30 and 60 ppm by volume.

However, it is also possible for a criterion derived from the nitrogen oxide concentration to be used as the regeneration criterion, such as for example the cumulative emission of nitrogen oxides downstream of the main catalyst during lean-burn operation.

After the regeneration criterion has been reached, it is customary for total regeneration of the catalyst system to be carried out, i.e. the intensity and duration of rich-burn mode of the engine are selected in such a way that both the starting catalyst and the main catalyst are regenerated. The criteria for termination of regeneration is the breakthrough of rich exhaust gas downstream of the main catalyst. This breakthrough can be detected with a nitrogen-oxide sensor because such a sensor can also detect rich exhaust gas. The lean-burn time, i.e. the time between two required regenerations of the catalyst system, can be regarded as a measure of the remaining nitrogen oxide storage capacity of the system as a whole.

Since the starting catalyst is exposed to in some cases very high temperatures, on account of being arranged close to the engine, it is advisable for its storage capacity to be determined separately from that of the main catalyst. According to the invention, for this purpose the entire catalyst system, as also in the other lean-burn phases, is laden with nitrogen oxides until the regeneration criterion is reached or until another (lower) regeneration criterion is reached. Then, however, instead of total regeneration only a partial regeneration is carried out, comprising only regeneration of the starting catalyst. The signal from the oxygen sensor arranged downstream of the starting catalyst in the exhaust system can be used to end the partial regeneration. When the oxygen sensor records a breakthrough of rich exhaust gas through the starting catalyst, the partial regeneration is terminated. The nitrogen oxide loading of the main catalyst remains virtually unaffected by this regeneration.

After the partial regeneration has taken place, the engine is switched back to lean-burn mode and the time until the regeneration criterion used is reached again is measured. Since the nitrogen oxide loading of the main catalyst remains substantially unaffected by the partial regeneration, the time which is now measured is dependent solely on the remaining nitrogen oxide storage capacity of the starting catalyst.

Figure 2:
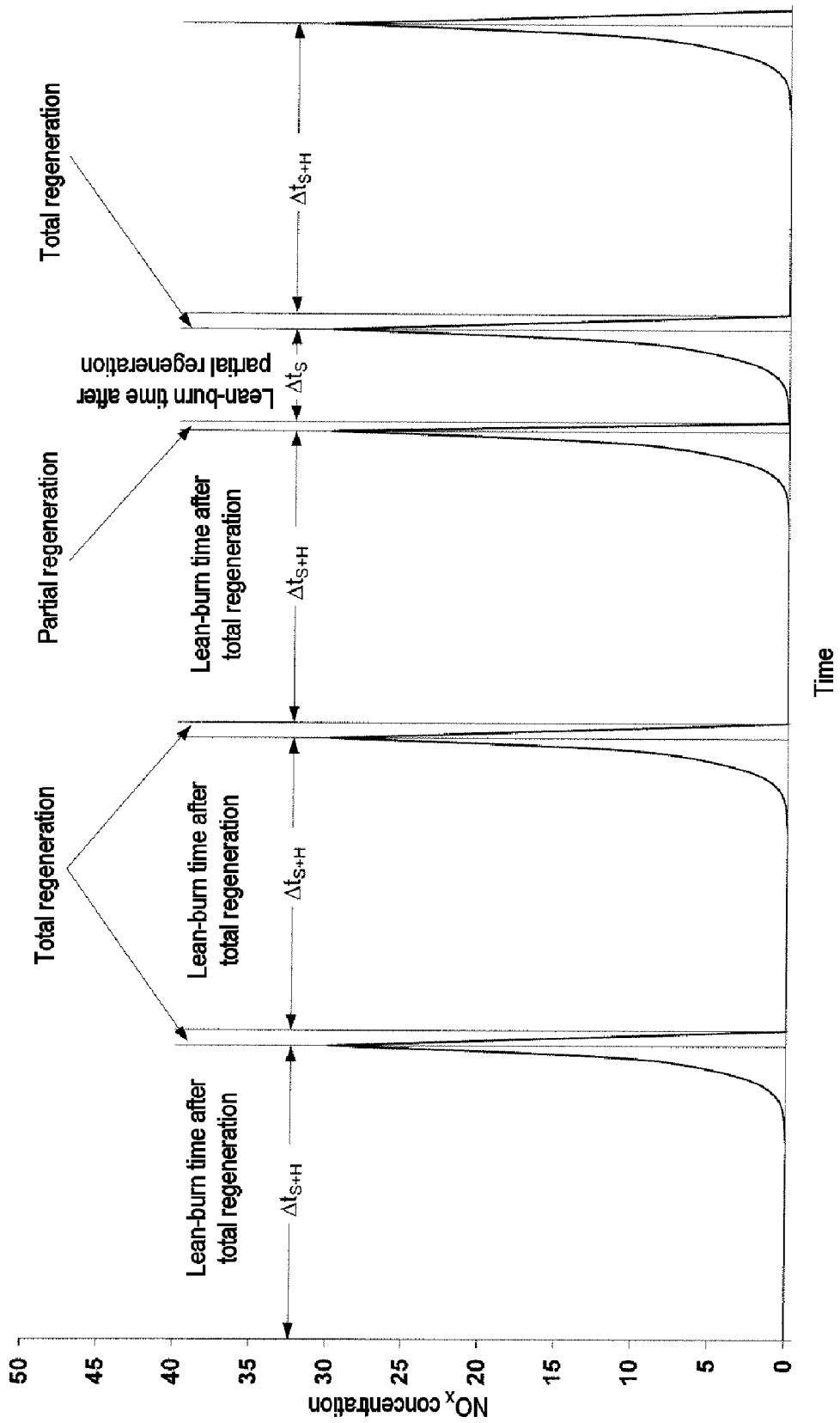
FIG. 2: diagrammatically depicts the process sequence in accordance with the invention.

FIG. 2 diagrammatically depicts the method sequence which has just been described. This figure shows the nitrogen oxide concentration downstream of the main catalyst as a function of time over a plurality of cycles of storage phase and regeneration phase. Time axis and NOx-concentration axis are scaled in arbitrary units. In FIG. 2 the regeneration criterion is assumed to be surpassing a value of 30 for the NOx-concentration downstream of the main catalyst. After the regeneration of the catalyst system has taken place, the nitrogen oxide slippage through the system is initially zero for a certain period of time. Only after the storage capacity has gradually been exhausted do nitrogen oxides start to break through the system. The regeneration is initiated when the concentration of nitrogen oxides downstream of the main catalyst exceeds a predetermined limit value or when another, derived criterion is satisfied. The time difference $\Delta t_{S+H}$ required for this to occur is a measure of the nitrogen oxide storage capacity of the overall system. $\Delta t_{S+H}$ is also indicated in FIG. 2 as the lean-burn time after total regeneration. $\Delta t_S$, by contrast, is the lean-burn time after regeneration of the starting catalyst alone (partial regeneration of the catalyst system) and according to the invention is a measure of the remaining nitrogen oxide storage capacity of the starting catalyst.

The method which is now proposed has significant advantages over the method for separate assessment of nitrogen oxide storage function and oxygen storage function proposed in DE 198 16 175 A1. According to DE 198 16 175 A1, the nitrogen oxide storage capacity is assessed by forming the difference between two relatively short time intervals, namely the difference between the regeneration time of the two storage functions and refilling the oxygen store after regeneration. This is naturally subject to relatively major errors. By contrast, the nitrogen oxide storage capacity of the starting catalyst is determined separately from the oxygen storage function, by measuring the lean-burn time after partial regeneration. The lean-burn time is generally greater by a factor of 5 to 100 than the duration of the partial regeneration and can be measured with corresponding accuracy.

As has already been explained, the method can be operated using various regeneration criteria. It is preferable for a criterion selected to be the nitrogen oxide concentration in the exhaust gas downstream of the catalyst system exceeding a predetermined value. Alternatively, the nitrogen oxide concentration in the exhaust gas downstream of the catalyst system can be integrated during the lean-burn time. If this cumulative nitrogen oxide value exceeds a predetermined limit value, regeneration is initiated.

The method can be used both for lean-burn engines with wall-guided operation or spray-guided operation.

The oxygen sensor (5) shown in FIG. 1 may be what is known as a two-point lambda sensor or a linear lambda sensor. The signal from a two-point lambda sensor switches from lean to rich or vice versa within a narrow air/fuel ratio range around 1, whereas the linear lambda sensor delivers a signal which rises linearly with the oxygen content in the exhaust gas. The way in which the lambda sensors that are suitable for the method function is described in the Bosch Automotive Handbook, VDI-Verlag, $20^{th}$ Edition from 1995, pages 490 to 492.

The invention claimed is:

1. A method for monitoring the nitrogen oxide storage capacity of a nitrogen oxide storage catalyst used as a starting catalyst in an exhaust-gas purification system of a motor vehicle with a lean-burn engine, the system including the starting catalyst and a main catalyst, which is likewise designed as a nitrogen oxide storage catalyst, the catalyst system in each case being regenerated by the engine being briefly switched from lean-burn mode to rich-burn mode when the evaluation of the nitrogen oxide slippage downstream of the catalyst system exceeds a regeneration criterion, wherein nitrogen oxide storage capacity of the starting catalyst is checked when regeneration of the catalyst system is due, by the rich-burn mode being terminated and the engine being switched back to lean-burn mode when a breakthrough of rich exhaust gas is recorded between the starting catalyst and the main catalyst, and by the time between the engine being switched back to lean-burn mode and the regeneration criterion being exceeded once again downstream of the catalyst system being measured as a measure of the nitrogen oxide storage capacity.

2. The method according to claim 1, wherein the regeneration criterion selected is nitrogen oxide concentration in the exhaust gas downstream of the catalyst system exceeding a predetermined value.

3. The method according to claim 1, wherein the regeneration criterion selected is cumulative nitrogen oxide concentration/nitrogen oxide mass in the exhaust gas downstream of the catalyst system exceeding a predetermined value.

4. The method according to claim 1, wherein the lean-burn engine is a wall-guided or spray-guided lean-burn engine.

5. An exhaust-gas purification system for carrying out the method according to claim 1, including a starting catalyst and a main catalyst at a distance from the starting catalyst, both of which catalysts are designed as nitrogen oxide storage catalysts, as well as an oxygen sensor between the starting catalyst and main catalyst, and a nitrogen oxide sensor downstream of the main catalyst.

6. The exhaust-gas purification system according to claim 5, wherein the oxygen sensor is a linear lambda sensor or a two-point lambda sensor.

* * * * *